United States Patent [19]

Okada

[11] Patent Number: 4,492,137
[45] Date of Patent: Jan. 8, 1985

[54] APPARATUS FOR REMOVING LIGATING FITTINGS ON SMOKING CASINGS

[75] Inventor: Shingo Okada, Tokyo, Japan

[73] Assignee: Kureha Kagaku Kogyo Kabushiki Kaisha, Tokyo, Japan

[21] Appl. No.: 433,811

[22] Filed: Oct. 12, 1982

[30] Foreign Application Priority Data

Oct. 15, 1981 [JP] Japan .................. 56-153099[U]
Oct. 15, 1981 [JP] Japan .................. 56-153100[U]
Oct. 15, 1981 [JP] Japan .................. 56-153101[U]
Oct. 15, 1981 [JP] Japan .................. 56-153102[U]

[51] Int. Cl.³ .............................................. B26D 7/14
[52] U.S. Cl. ........................................ 83/175; 83/418; 83/732
[58] Field of Search .............. 83/732, 278, 423, 435.1, 83/435.2, 175, 418; 17/1 F; 198/456

[56] References Cited

U.S. PATENT DOCUMENTS

| | | | |
|---|---|---|---|
| 1,671,038 | 5/1928 | Mc Kain | 83/732 |
| 3,654,978 | 4/1972 | Gobel | 83/423 X |
| 4,060,875 | 12/1977 | Gosling | 17/1 F |
| 4,194,268 | 3/1980 | Deerwester | 17/1 F |
| 4,214,492 | 7/1980 | Hoffman | 17/1 F X |
| 4,219,299 | 8/1980 | Watson | 83/175 |
| 4,233,709 | 11/1980 | Smith et al. | 17/1 F |

Primary Examiner—James M. Meister
Assistant Examiner—John L. Knoble
Attorney, Agent, or Firm—Woodcock, Washburn, Kurtz, Mackiewicz & Norris

[57] ABSTRACT

While conveyed along a deck plate of the apparatus, a smoked ham is conveyed toward a side of the deck plate to have an outer end of an ear of smoked ham casing sandwiched by a sandwiching conveyer, a shoulder of the smoked ham is then pushed by a first guide portion of a guide so that a ligating fitting of the smoked ham casing may be pulled out of a base of the ear, in succession thereto is extended a gap between the ligating fitting and the shoulder by a second guide portion of the guide, and thereafter the base of the ear is cut off by a cutter which occupies a position relative to that of the guide. Therefore, the ear of the smoked ham casing can be accurately cut off at a predetermined position.

4 Claims, 20 Drawing Figures

APPARATUS FOR REMOVING LIGATING FITTINGS ON SMOKING CASINGS

BACKGROUND OF THE INVENTION

1. Field of the Invention

This invention relates to an apparatus for removing ligating fittings on smoking casings wherein the smoking casing called "fibrous casing" is filled in the shape of a column with raw material meat and both ends of the casing are ligated by ligating fittings of aluminum or the like, to provide smoked hams such as roast ham, boneless ham, etc.

2. Description of the Prior Art

In an apparatus for romoving ligating fittings on smoking casings, smoked hams are conveyed along and parallel to an immovable deck plate with a plurality of conveyer plates mounted on a pair of endless rotatable bodies and moved over said deck plate, while being conveyed aslant to approach the side of the deck plate with a deflecting conveyer provided to be a little exposed above the deck plate and moved with a speed higher than that of the conveyer plate, and ears of said conveyed aslant smoked hams are sandwiched for conveyance by sandwiching converyers provided near the side of the deck plate and moved in the same direction and with the same speed as the conveyor plate while being inseted into lateral slots of guides provided along the inner side of the sandwiching converyers corresponding to the side of the deck plate to guide ligating fittings mounted on the bases of the ears toward the outer side of the guides so that the bases of the ears are cut off by cutters provided on the terminal positions of the guides at the insides of the ligating fittings for said guided smoked hams.

However, the movement of said deflecting conveyer is difficult to be transmitted to said conveyed smoked hams without any slippages to that the length of said deflecting conveyer tends to be longer so as to compensate for such slippages, resulting in the increase of the length of the whole apparatus and thus the difficulty of miniaturization of the apparatus. Also, if the length of the deflecting conveyer is left short to avoid this result, the bases of said ears of smoked hams tend not only to be cut off irregularly to interfere with the positive operation of the apparatus, but also to reduce the commercial value of the smoked ham.

SUMMARY OF THE INVENTION

An object of this invention is to provide an apparatus for removing ligating fittings on smoking casings in which the smoked hams can surely be conveyed aslant to the conveying direction of a means of conveying the smoked hams along the longitudinal axis of the apparatus to a disired distance during a short conveying distance of said conveying means.

A further object of this invention is to provide an apparatus for removing ligating fittings on smoking casings in which ears of smoked hams can be accurately cut off at a predetermined position.

These and another objects are achieved with an apparatus for removing ligating fittings on smoking casings comprising a plurality of conveyer plates mounted on a pair of endless rotary bodies situated respectively each side of an immovable desk plate and moved over said desk plate for conveying smoked hams along said desk plate, deflecting conveyers for conveying said smoked hams aslant and bringing them close to the sides of said desk plate, provided obliquely to the moving direction of said conveyer plates, exposed a little above said deck plate, moved with a higher speed than that of said conveyer plates and constituted with conveyer belts, on the surfaces of which a plurality of ribs are provided at stated intervals in the longitudinal direction of said conveyer belts and approximately parallel to said conveyer plates, sandwiching conveyers for sandwiching ears of said conveyed aslant smoked hams, provided near the sides of said deck plate and moved with the same speed and in the same direction as said conveyer plates, guides capable of inserting said ears into their lateral slots and guiding ligating fittings being mounted on the bases of said ears to the outsides of said guides namely corresponding to the opposite sides of said deck plate, provided along the insides of said sandwiching conveyers, and cutters for cutting off the bases of said ears at the inside portions of said bases for said ligating fittings to be mounted on, provided at the terminal positions of said guides.

Various other objects, advantages and features of the present invention will become readily apparent from the ensuring detailed description, and the novel features will be particularly pointed out in the appended claims.

BRIEF DESCRIPTION OF THE DRAWINGS

The drawings show an embodiment of this invention in which.

DETAILED DESCRIPTION OF PREFERRED EMBODIMENTS

Figure 1:
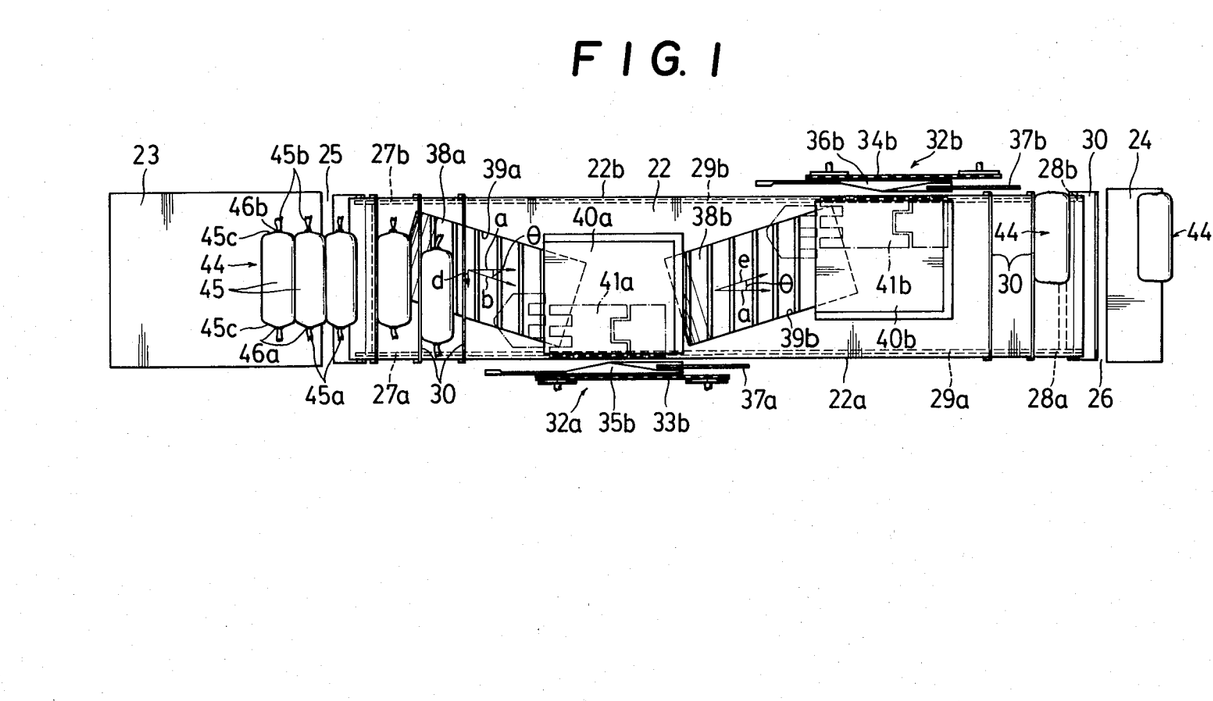
FIG. 1 is a plan view of the whole apparatus.
Figure 2:
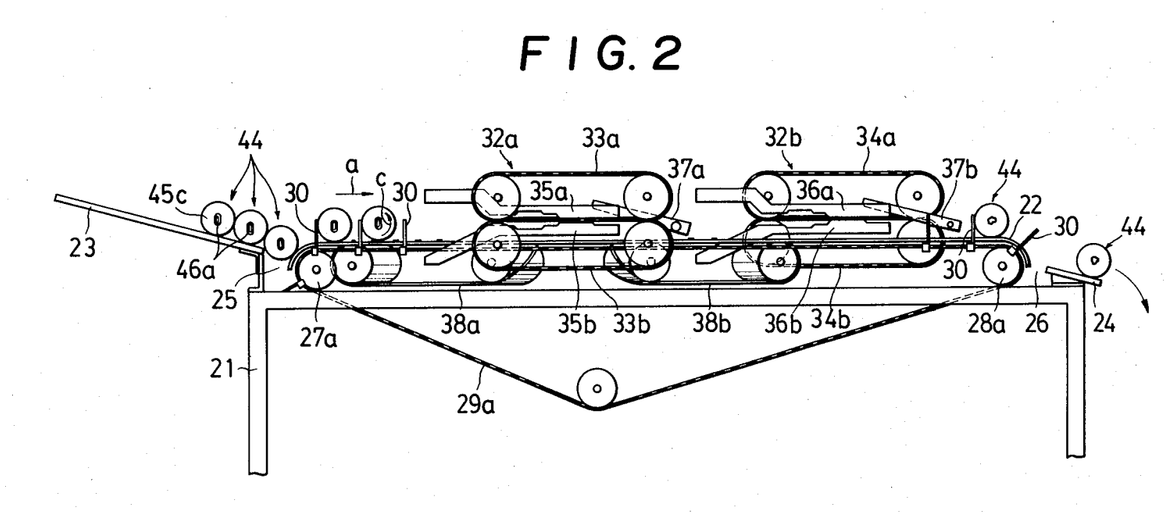
FIG. 2 is a side view of the same apparatus as that in FIG. 1.

FIGS. 1 and 2 show the whole apparatus in which a deck plate 22 is horizontally fixed to a frame bed 21 and provided on the front and rear portions with a supply chute 23 and a discharge chute 24 fixedly spaced from the deck plate. And pairs of left and right sprockets 27a, 27b and 28a, 28b are born by both front and rear portions of the deck plate 22 at the lower portion thereof, and a pair of left and right endless chains 29a, 29b are trained over said sprockets horizontally. A plurality of conveyer plates 30 mounted on these endless chains 29a, 29b are provided at equal intervals longitudinally of both endless chains 29a, 29b. These conveyer plates 30 spanning the deck plate 22 are mounted on both endless chains 29a, 29b and translated along the deck plate 22 by the rotation of both endless chains 29a, 29b in the direction of arrow a. Also, a pair of left and right ear cutting units 32a, 32b are arranged at both left and right side ends 22a, 22b of the deck plate 22, one ear cutting unit 32a on one side end 22a being arranged at approximately longitudinally middle portion of the deck plate 22 and the other ear cutting unit 32b being arranged at the terminal side on the other side of the deck plate 22. Further these both ear cutting units 32a, 32b are constituted respectively with pairs of upper and lower sandwiching conveyers 33a, 33b and 34a, 34b guides 35a, 35b and 36a, 36b and cutters 37a, 37b. Pairs of sandwiching conveyers 33a, 33b and 34a, 34b in the respective ear cutting units 32a, 32b are arranged parallel to both endless chains 29a, 29b at the outside positions of the respective pairs of guides 35a, 35b and 36a, 36b and the respective pairs of sandwiching conveyers 33a, 33b and 34a, 34b are constituted to move in the same direction and with the same speed as the conveyer plate 30. Also, a pair of deflecting conveyers 38a, 38b are arranged on the deck plate 22 from the start end side to the start end side of one ear cutting unit 32a and from the terminal end side of the above ear cutting unit 32a to the start end side of the other ear cutting unit 32b. Further these both deflecting conveyers 38a, 38b are arranged horizontally to be exposed a little above the deck plate 22 through a pair of openings 39a, 39b provided in the plate deck 22, and, in FIG. 1, one deflecting conveyer 38a is slanted in the direction of arrow b at a predetermined angle θ to the moving direction (direction of arrow a) of the conveyer plate 30 while the other deflecting conveyer 36b is slanted in the direction of arrow c by a predetermined angle θ similarly. These both deflecting conveyers 38a, 38b are constituted to move in the respective slant directions (directions of arrows b, c) with a moving speed higher than that of the conveyer plate 30. Also, a pair of subplates 40a, 40b are fixedly and horizontally arranged on the deck plate 22 to be opposed to the side of both ear cutting units 32a, 36b, and further the start end sides of these both subplates 40a, 40b are arranged to span the upper portion of the terminal end sides of both defelcting conveyers 38a, 38b and the conveyer plates 30 are constituted to move over the upper portions of these both subplates 40a, 40b without colliding therewith. Also, a pair of pressing mechanisms 41a, 41b are arranged of positions corresponding to the upper positions of both subplates 40a, 40b and adjacent both ear cutting units 32a 32b so that the conveyer plates 30 also are constituted to move under the lower portion of these both pressing mechanisms 41a, 41b without colliding therewith.

Next will be described the automatic operation for removing ligating fittings for smoked hams 44 such as roast ham, boneless ham, etc. As is well known, since the smoked ham 44 is smoked after suitable treatment of raw material meat, a smoking casing 45 called fibrous casing (hereinafter called simply "casing") capable of smoking is filled in the shape of a column with raw material meat and ligated at both ends by a pair ligating fittings 46a, 46b of aluminum or the like.

When first the smoked hams 44 are mounted in parallel on supply chute 23, they roll down by their own weight and fall upon the start end of the deck plate 22 to be successively supplied between the conveyer plates 30 moving in the direction of arrow a along the upper surface of the deck plate 22. And the smoked hams 44 are urged by the conveyer plates 30 to be translated to the direction of arrow a while rolling over the deck plate 22.

And when the smoked ham 44 rides on one deflecting conveyer 38a, the smoked ham 44 rotates in the direction of arrow c, since the moving speed of the deflecting conveyer 38a is higher than that of the conveyer plates 30. Further, since the deflecting conveyer 38a is moved in the direction of arrow b, moving vector in the direction of arrow d perpendicular to the direction of arrow a is added to the smoked ham 44. That is, spirally rotating motive force is given to the smoked ham 44 by these resultant forces. And the smoked ham 44 is urged by the conveyer plate 30 while performing the spiral rotating movement to be obliquely conveyed for approaching successively the start end position of one ear cutting unit 32a.

And one ear 45a of the casing 45 of the smoked ham 44 reaching to the start end position of one ear cutting unit 32a is inserted into a lateral slot, which will be described later, between a pair of guides 35a, 35b so that the ear 45a is sandwiched from above and below by a pair of sandwiching conveyers 33a, 33b. Since both sandwiching conveyers 35a, 35b are moved in the same direction and with the same speed as the conveyer plate 30, the smoked hams 44 are thereafter urged by the conveyer plates 30 with the ears 45 being sandwiched by the sandwiching conveyers to be translated in the direction of arrow a. Immediately before the smoked ham 44 is sandwiched at the ear 45a, it rides over the subplate 40a to proceed slidably over the subplate 40a. While the smoked ham 44 is conveyed with its ear 45a being sandwiched, one ligating fitting 46a mounted on the base of the ear 45a is guided by both guides 35a 35b so that the ligating fitting 46a is guided to the outside (the lower side in FIG. 1) of both guides 35a, 35b. Then, the smoked ham 44 reaches the terminal ends of both guides 35a, 35b so that the base of the ear 45a is automatically cut off at the inside of the ligating fitting 46a by one cutter 37 provided on the terminal end position to remove the ligating fitting 46a together with the ear 45a.

Next, the smoked ham 44 is placed on the other deflecting conveyer 38b successively, and conveyed obliquely toward the start end position of the other ear cutting unit 32 while still continuing the spiral rotating movement to be conveyed in the direction of arrow e this time while rotating in the direction of arrow c in the same way as above mentioned. In the other ear cutting unit 32b, quite same operations as those in the above mentioned one ear cutting unit 32a are carried out so that the base of the other ear 45b of the casing 45 for the smoked ham 44 is cut off automatically at the inside of the other ligating fitting 46b to remove the ligating fitting 46b together with the ear 45b. Further, thereafter the samoked ham 44 is conveyed successively in the direction of arrow a by the conveyer plates 30 to be discharged into the discharge chute 20.

Figure 3:
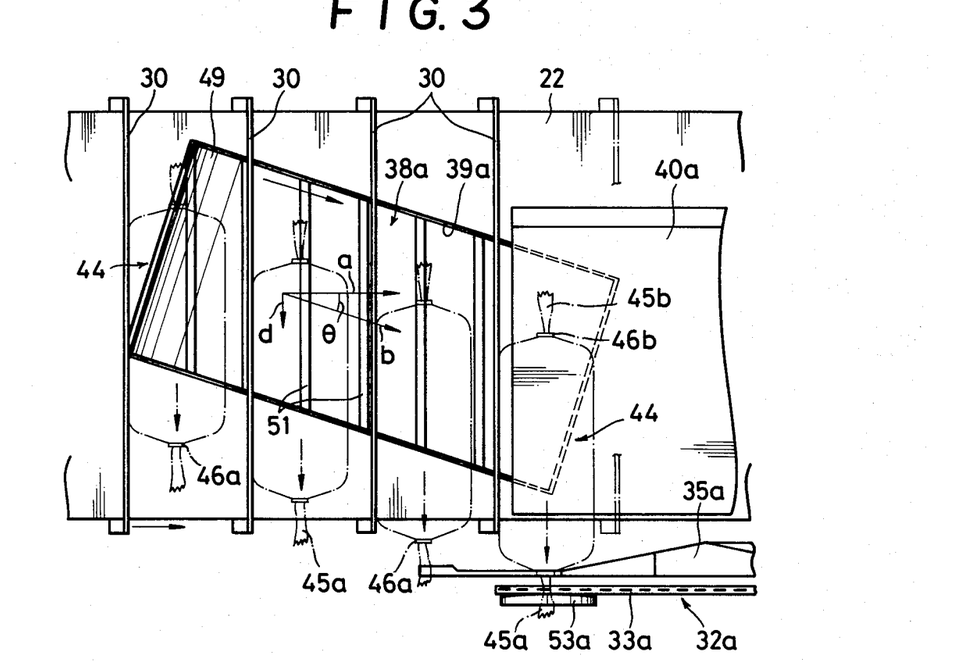
FIG. 3 is a plan view showing a deflecting conveyer section.
Figure 4:
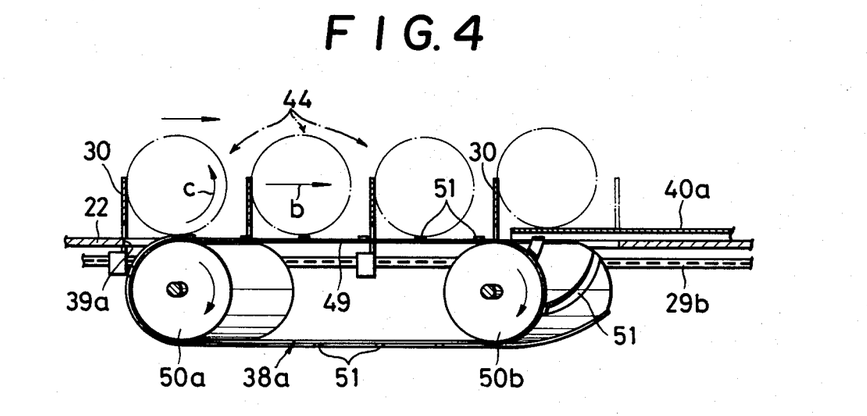
FIG. 4 is a side view showing similar section.

Next will be described one deflecting conveyer 38a with reference to FIGS. 3 and 4. Further, since the other deflecting conveyer 38b has the same construction as the one deflecting conveyer 38a, the description of the other one is omitted.

First, the deflecting conveyer 38a is constituted with a belt conveyer and a conveyer belt 49 is trained over a pair of rollers 50a, 50b to be rotated in the direction of arrow b by either of rollers 50a, 50b driven rotatably. A plurality of ribs 51 are provided at equal intervals on the surface of the conveyer belt 49 longitudinally thereof and parallel to said conveyer plates 30.

While by the deflecting conveyer 38a thus constituted is rotated, as mentioned above, the coveyer belt 49 in the direction of arrow b slanted by a predetermined angle $\theta$ to the moving direction (direction of arrow a) of the conveyer plate 30 with a speed higher than that of the conveyer plate 30, a plurality of ribs 51 on the surface of the conveyer belt 49 are in contact with the smoked hams 44 in a state parallel to their longitudinal axes to hook and rotate the smoked ham 44. Thus, the contact resistance between the conveyer belt 49 and the smoked ham 44 is very large so that the smoked ham 44 is rotated positively in said direction of arrow c while being subjected to a very positive spiral rotating force to be conveyed positively in said direction of arrow d and urged by the conveyer plate 30 to be conveyed aslant very rapidly towards the start end position of the one ear cutting unit 32a.

According to said deflecting conveyer 38a, the spiral feed speed of the smoked ham 44 becomes very high so that the smoked ham 44 can be very rapidly spirally fed in a short conveying distance by the conveyer plate 30. As a result the smoked ham 44 can be very effectively spirally fed even if the length of the deflecting conveyer 38a is sufficiently shortened. Thus, this can contribute much to the miniaturization of the whole apparatus.

Next will be described one ear cutting unit 32a with reference to FIGS. 5-9F.

Since the smoked ham is soft and easily transformed, it is difficult to provide uniform ligating condition by ligating fittings, and usually the ligating position is often irregular. Also, the smoked ham is liable to be transformed by shocks or the like in transportation of the smoked hams which embed the ligating fittings into the shoulders of the smoked hams. When such ligating fittings are embedded into the shoulder of the smoked ham, the ligating fittings are difficult to be guided positively to the outsides of the guides so that they are liably to be wrongly cut off. Thus, the ears of the smoked ham are liable to disadvantageously cut off at the outsides of the ligating fittings or at the central portions of same to leave a portion of the ligating fittings.

Said ear cutting unit 32a overcomes these defects. First, a pair of upper and lower sandwiching conveyers 33a, 33b are constituted with pairs of front and rear sprockets 53a, 53b and 54a, 54b and a pair of endless chains 55a, 55b trained horizontally over said sprockets. Further, these both endless chains 55a, 55b are arranged a little laterally biased from each other as shown in FIGS. 9A-9F and somewhat pressed from above and below by each other. The pressed surfaces of these both endless chains 55a, 55b are set to the height of the center line P of the smoked ham 44. Also, these both endless chains 55a, 55b are constituted to rotate in the same direction and with the same speed as the conveyer plate 30 by driving rotatably either of sprockets 53a, 54a or 53a, 54b.

Next, a pair of upper and lower guides 35a, 35b are arranged horizontally between both endless chains 55a 55b and the conveyer plates 30, and vertically symmetrically about said center line P to form a horizontal slot 56 between these both guides 35a, 35b. Further, the start end side (the left side end in FIG. 5) of these both guides 35a, 35b are formed with upper and lower tapered inlet guides 57a, 57b.

The rear side shapes of the inlet guide portions 57a, 57b of these both guides 35a, 35b are constituted to be approximately vertically symmetrical. Hereinafter will be described the shape of the lower guide 35b with reference to FIGS. 7-9F.

Figure 7:
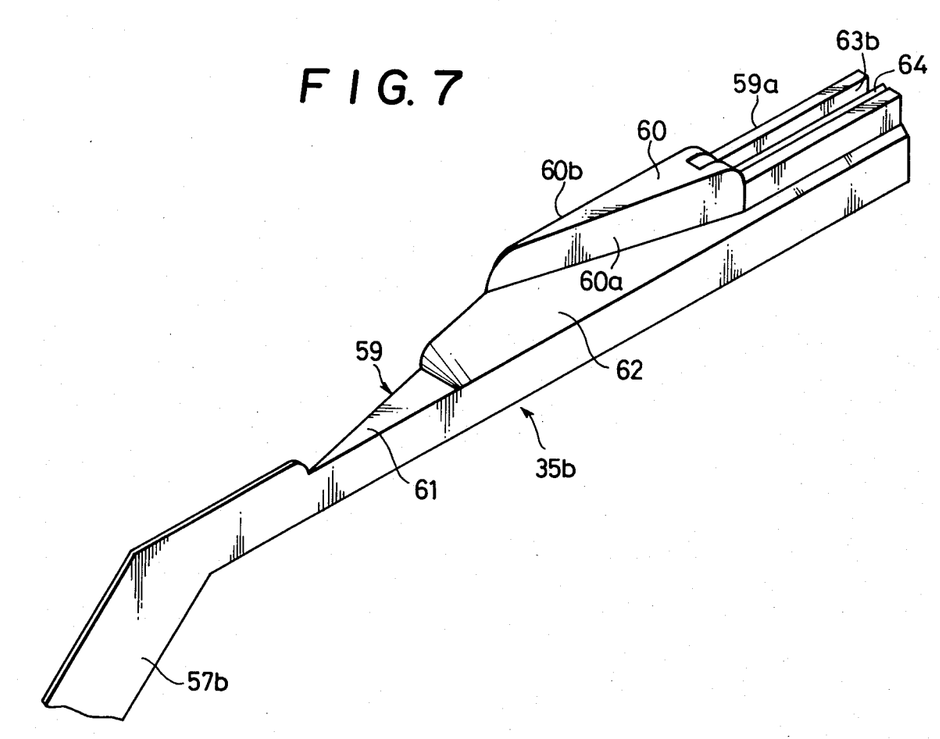
FIG. 7 is a perspective view of the lower guide.

The vertical side surface of the lower guide 35b at the conveyer plate 30 side constitutes a first guide portion 59. This first guide portion 59 is constituted to have a slant surface which is kept away from both sandwiching conveyers 33a, 33b successively as it extends in the moving direction (direction of arrow a) of the conveyer plate 30. The rear side of the slant surface constitutes a surface 59a parallel to both sandwiching conveyers 33a, 33b. Next, a second guide portion 60 is provided in a zone from the terminal end to the rear side of the first guide portion 59 on the upper surface of the lower guide 35b. This second guide portion 60 is generally wedge-shaped and formed integrally with the first guide portion 59 to be elevated by a predetermined height $h_1$ above the upper end edge of the first guide portion 59. A vertical side surface facing to the sandwiching conveyers (33a) (33b) either of left and right side surfaces of the second guide portion 60 is formed such a surface designated to 60a as to approach the sandwiching conveyers 33a, 33b gradually as it extends in the moving direction (direction of arrow a) of the conveyer plate 30, and the other vertical side surface 60b facing to the side of conveyer plate 30 is formed flush with said parallel surface 59a. Next, the lower guide 35b is provided on the upper surface with a recess 61 cut out by a predetermined height $h_2$ below the upper end edge of the first guide portion 59 in the start end side of the first guide portion 59, and the recess 61 is provided at the rear side with a slant surface 62 which descends successively as it approaches both sandwiching conveyers 33a, 33b.

Next, both upper and lower guides 35a, 35b are provided in the terminal ends with slits 63a, 63b biased to the conveyer plate 30 side, and said one cutter 37a is arranged in both slits 63a, 63b. Further, the cutter 37a is constituted with a fixed blade 64 fixed in the slit 63b of the lower guide 35b and a movable blade 66 driven rotatably about a fulcrum shaft 65 in the upper and lower direction.

According to the ear cutting unit 32a thus constituted, as mentioned above, when the smoked ham 44 urged by the conveyer plate 30 to be conveyed aslant while carrying out said spiral rotation movement reaches the start end position of the ear cutting unit 32a, one ear 45a on the casing 45 of the smoked ham 44 is first guided between the inlet guide portions 57a, 57b of both guides 35a, 35b to be inserted into the lateral slot 56 between these both guides 35a, 35b.

Figure 8:
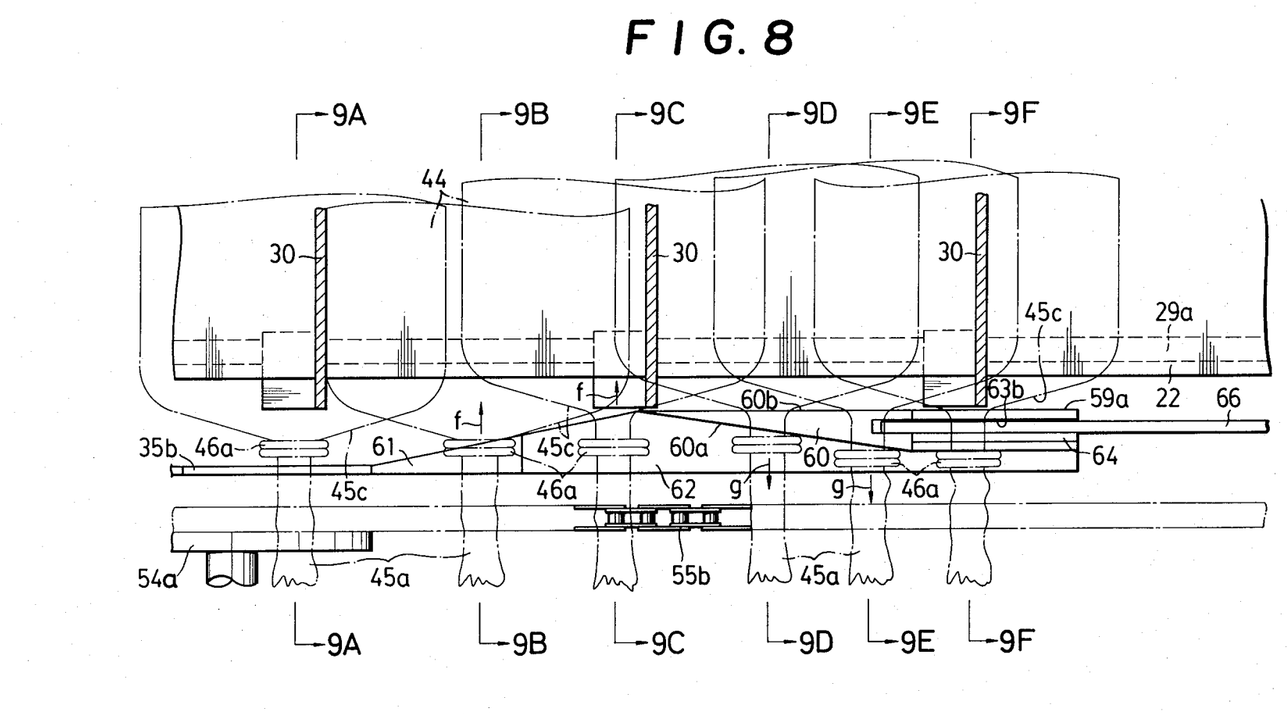
FIG. 8 is a plan view explaining guiding action of the guide for smoked hams.
Figure 9A:
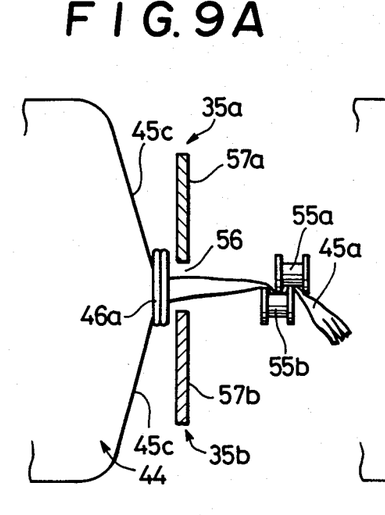
FIGS. 9A, 9B, 9C, 9D, 9E and 9F are sectional end views respectively taken along the lines 9A—9A, 9B—9B, 9C—9C, 9D—9D, 9E—9E and 9F—9F in FIG. 8.

The inserted ear 45a is first guided between both endless chains 55a, 55b in the position of 9A—9A of FIG. 8 as shown in FIG. 9A to be sandwiched from above and below between these chains. Thereafter the amoked ham 44 is left sandwiched at the ear 45 between both endless chains 55a, 55b to be urged by the conveyer plate 30 and translated to the position in which it is cut off by the cutter 37a.

Figure 9B:
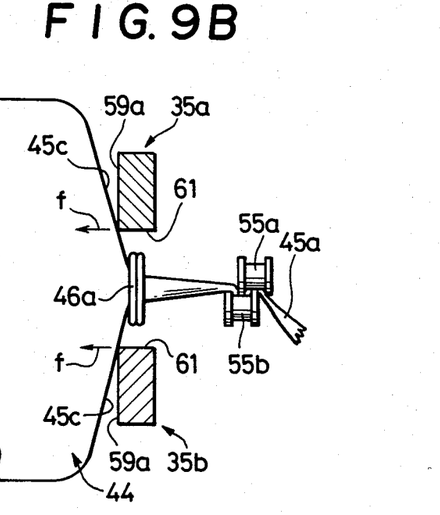

First then, the shoulder 45c of the casing 43 abuts relatively against the first guide portions 59 of both guides 35a, 35b at the upper and lower neighborhoods of the ear 45a of the smoked ham 44 in position 9B—9B of FIG. 8 as shown in FIG. 9B and the shoulder 45c is urged successively in the direction of arrow f to be kept away from both endless chains 55a, 55b correspondingly to the slant of the first guide portion 59.

Figure 9C:
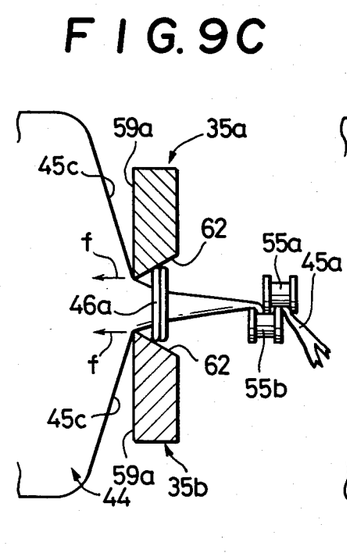

By the urging action of the first guide portion 59 on the shoulder 45c, the ear 45c sandwiched between both endless chains 55a, 55b and slackened initially as shown in FIG. 9A is tensioned successively as shown in FIGS. 9B-9C as it proceeds from position 9B—9B to position 9C—9C in FIG. 8, and the tensioned condition of the ear 45a is maximum immediately after position 9C—9C of FIG. 8. Since one ligating fitting 46a is pulled away from the shoulder 45c by the tensioning action of the ear 45a the ligating fitting 46a will be positively pulled away from the shoulder 45c as shown in FIGS. 9B to 9C even if the ligating fitting 46a is embedded in the shoulder 45c as shown in FIG. 9A.

The one ligating fitting 46a passes through the recesses 61 of both guides 35a, 35b, to ride over the slant surface 62 and receive energizing force which urges the ligating fitting 46a to both endless chains 55a, 55b with the guiding action of the slant surface 62. Namely, the direction of the ligating fitting 46a when the ear 45a is sandwiched by both endless chains 55a, 55b (since the ligating fitting is approximately elliptically wound and fastened, difference between the larger diameter and smaller one of the ligating fitting is large and the direction said herein refers to the direction of the larger diameter) is not constant at all. Thus, the direction of the ligating fitting 46a may sometimes be approximately vertical so that the upper and lower ends of the ligating fitting abut against the slant surfaces 62 which then guide the ligating fitting 46a to the both endless chains 55a, 55b sides.

Figure 9D:
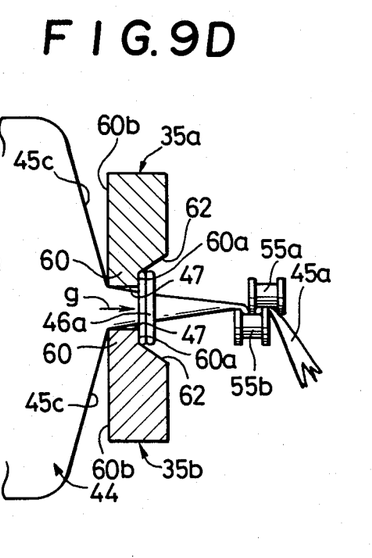

Next, the second guide portions 60 of both guides 35a, 35b are relatively inserted by wedge action between the shoulder 45c and the ligating fitting 46a above and below the ear 45a of the smoked ham 44 in position 9D—9D of FIG. 8 as shown in FIG. 9D. Since at that time gap 47 is already formed above and below the ear 45a between the shoulder 45c and the ligating fitting 46a as shown in FIG. 9C, the second guide portions 60 can be very positively inserted into the gap 47.

Figure 9E:
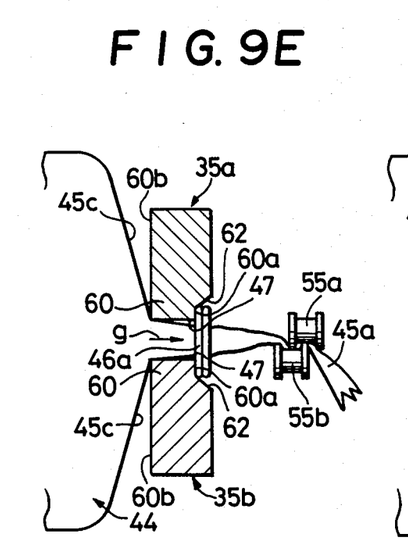

Next, in position 9E—9E of FIG. 8 as shown in FIG. 9E, the ligating fitting 46a this time is relatively pressed against the slant surface 60a of the second guide portion 60 to be urged successively along the slant surface 60a in the direction of arrow g, i.e. the direction of approaching both endless chains 55a, 55b.

As a result, the gap 47 between the shoulder 45c and the ligating fitting 46a is positively expanded further.

Figure 9F:
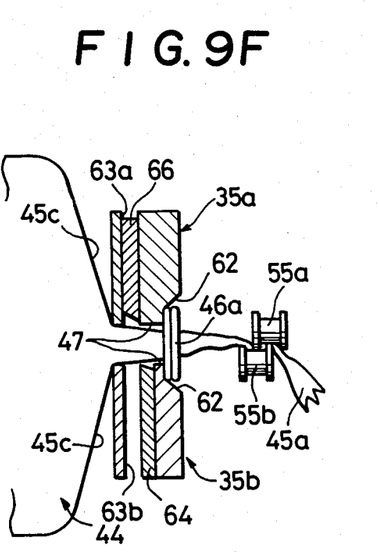

Next, as shown in FIG. 9F, in position 9F—9F of FIG. 8, the ear 45a of the smoked ham 44 soon reaches the cutting position of the cutter 37a and is cut off positively and accurately at its base in said gap 47 portion at the inside of the ligating fitting 46a between the movable blade 66 rotated from above to below and the fixed blade 64.

Thus, according to said ear cutting unit 32a the base of the ear can be cut off at the inside of the ligating fitting always accurately and positively to eliminate wrong cutting even if the ligating position of the ligating fitting is irregular or the ligating fitting is embedded in the shoulder of the smoked ham. Further, since the other ear cutting unit 32b is identical with said ear cutting unit 32a in construction, the description of the unit 32b is omitted.

Figure 10:
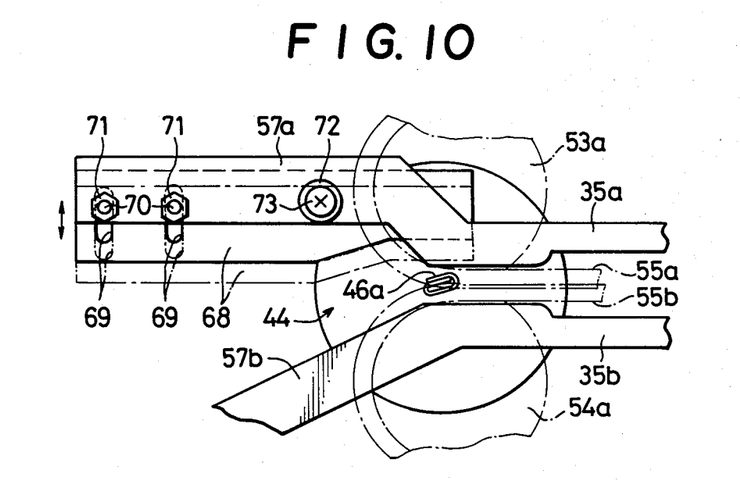
FIG. 10 is a side view explaining adjusing procedures for an inlet guide.
Figure 12:
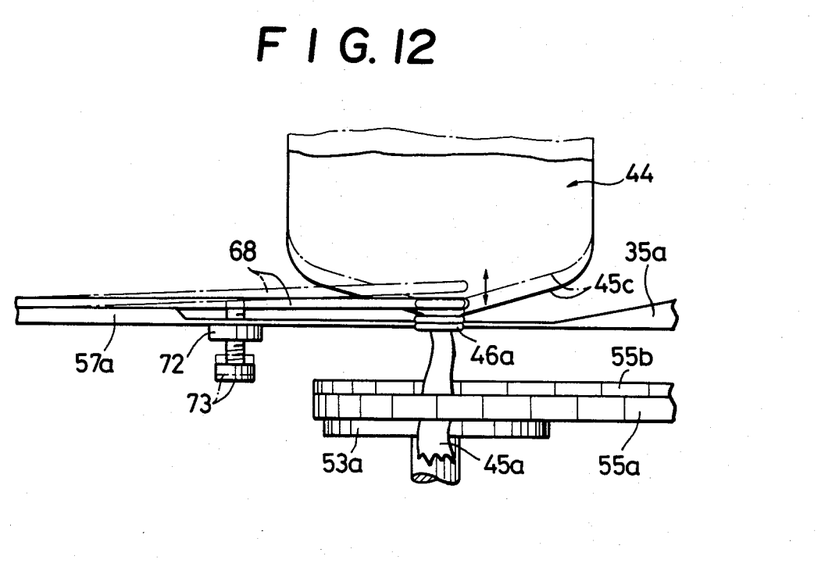
FIG. 12 is a plan view explaining the adjusing procedure for the inlet guide.

Next, as shown in FIGS. 10 and 12, an inlet guide portion 68 is mounted on the side surface of the inlet guide portion 57a of the upper guide 35a at the conveyer plate 30 side. This inlet guide 68 constituted with a leaf spring material is provided in two portions of the front end side (supply chute side) with slots 69 and vertically adjustably mounted on the inlet guide portion 57a with nuts 71 and screws 70 extending through these slots 69. Also, an end of an adjusting screw 73 extending through a nut 72 fixed to the inlet guide portion 57a in the rear end side (discharge chute side) of the inlet guide 68 engages the inlet guide 68 so that the flexibility of the inlet guide can be adjusted by adjusting the adjusting screw 73 against the elasticity with respect to the inside (conveyer plate side) of the inlet guide portion 57a.

Figure 13:
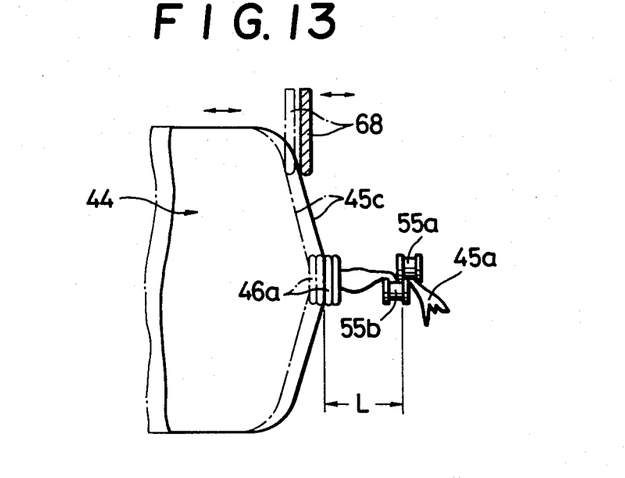
FIG. 13 is a front view of the inlet guide.

Now, as above mentioned, the inlet guides 68 regulate the gap L (see FIGS. 11 and 13) between both endless chains 55a, 55b and the smoked ham 44 such that the inlet guide 68 relatively abuts against the shoulder 45c of the smoked ham 44 immediately before the smoked ham 44 conveyed aslant while carrying out spiral rotational movement reaches the start end position of the ear cutting unit 32a and the ear 45a is guided between both inlet guide portions 57a, 57b to be sandwiched by both endless chains 55a, 55b.

Figure 11:
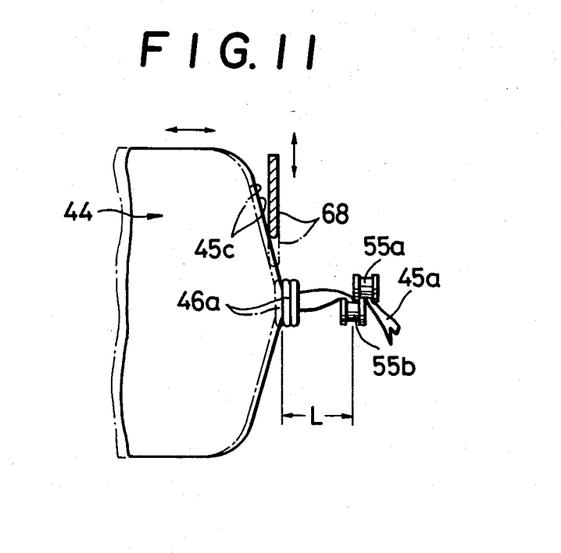
FIG. 11 is a front view of the inlet guide.

Thus, now as shown by the phantom line in FIGS. 10 and 11 when the inlet guides 68 are adjustably vertically moved along both slots 69, the engaging position of the shoulder 45c with the inlet guides 68 is adjusted to carry out fine adjustment of said gap L since the shoulder 45c of the smoked ham 44 is usually approproximately conical. Also as shown by the phantom line in FIGS. 12 and 13, when the rear end sides of the inlet guides 68 are adjusted by the adjusting screw 73 with respect to the flexibility, said gap is subjected to fine adjustment similarly.

By such adjustment of the gap L between both endless chains 55a, 55b and the smoked ham 44 the position in which the ear 45a is sandwiched by both endless chains 55a, 55b can be adjusted and thereby, as mentioned above, the second guide portions 60 of both guides 35a, 35b can be positively inserted between the shoulder 45c of the smoked ham 44 and the ligating fitting 46a to positively cut off the base of the ear 45a at the inside of the ligating fitting 46a.

Figure 5:
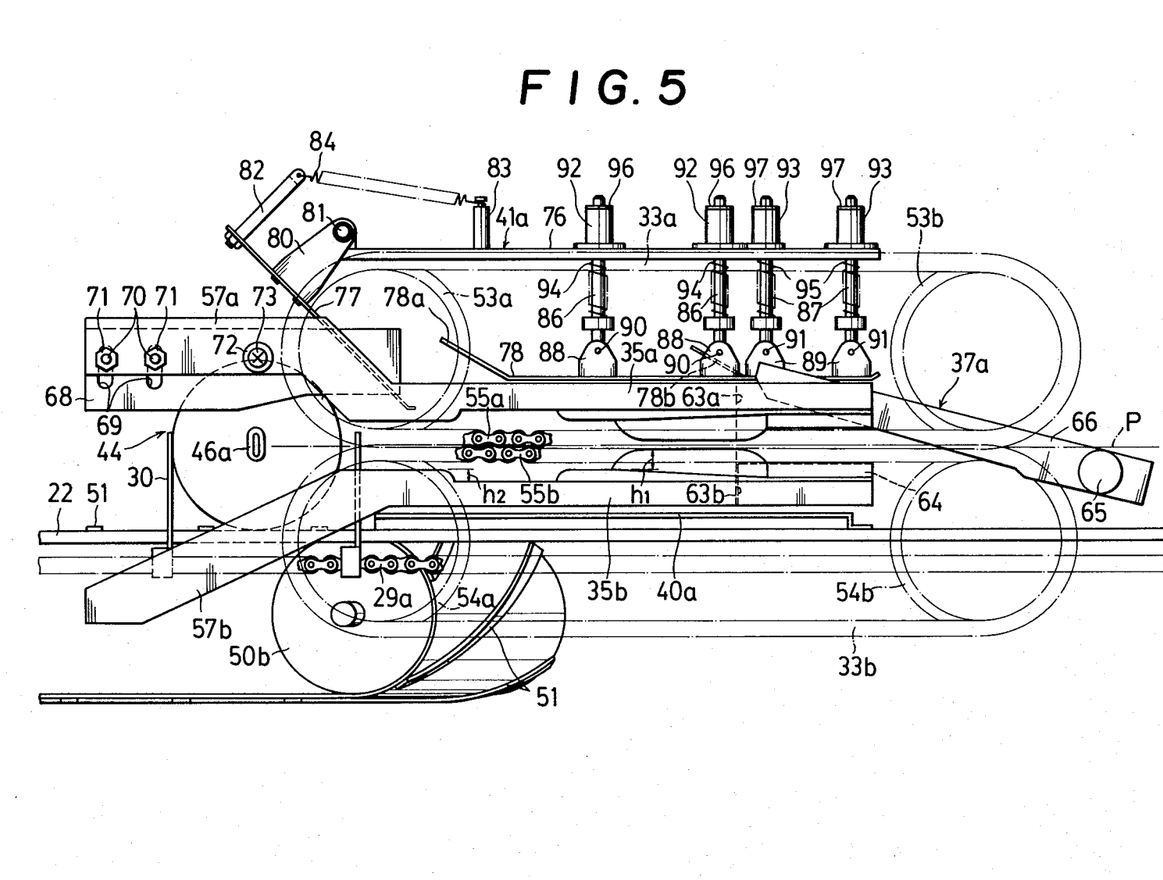
FIG. 5 is a side view showing sandwiching conveyers, guides, pressure plates and cutter sections.
Figure 6:
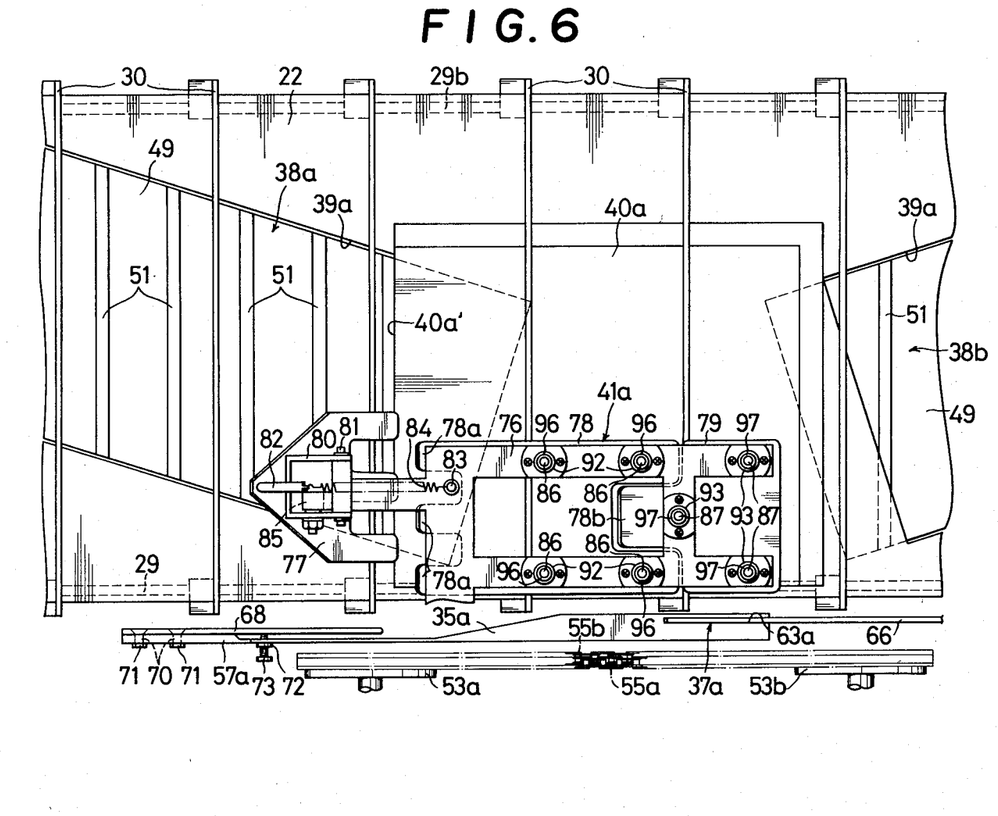
FIG. 6 is a plan view of similar sections.

Next will be described one poressing mechanism 41a with respect to FIGS. 5, 6 and 14.

Since prior sandwiching conveyers 33a, 33b sandwich the ear at one end side of the smoked ham to convey the smoked ham to the cutting position of the cutter, the other end side of the smoked ham is often moved forward or backward about the ear sandwiched by the sandwiching conveyers by vibration or the like during said conveyance so that the smoked ham is slanted unexpectedly with respect ot the conveyer plate and cut off aslant at the ear with cutter as it is left slanted. Such cut end tends to be enlarged so that the finished condition of the smoked ham vacuum packaged after removal of the ligating fitting is degraded to lower the commercial value.

Said pressing mechanism 41a overcomes these defects. A fixed frame 76 is horizontally provided at a position adjacent to the ear cutting unit 32a and corresponding to the upper portion of said subplate 40a, and below the fixed frame are arranged pressure plates 77, 78, 79 divided into three in the moving direction (direction of arrow a) of the conveyer plate 30. The front pressure plate 77 is arranged at one side of the start end position of the ear cutting unit 32a and pivoted verically about a horizontal fulcrum pin 81 on a bracket 80 above the fixed frame 76. Further, this front pressure plate 77 is pivotally urged clockwise in FIG. 14 by a spring 84 tensioned between a pair of pins 82, 83 fixed respectively to the upper portions of said pressure plate and fixed frame 76 so that a stopper 85 fixed to the bracket 80 engages the lower portion of the fixed frame 76 to regulate the front pressure plate 77 under the slant condition as shown in FIG. 14. Also, the intermediate and rear pressure plates 78, 79 are horizontally arranged at one side of the intermediate and terminal positions of the ear cutting unit 32a respectively. These pressure plates 78, 79 are pivoted respectively about horizontal fulcrum pins 90, 91 on brackets 88, 89 at the lower ends of four or three vertically movable pins 86, 87 hanging downward from the fixed frame 76. Further, the vertically movable pins 86, 87 extend respectively through holding tubes 92, 93 fixed to the fixed frame 76 to be vertically moved and urged downward by springs 94, 95 fitted around the outer peripheries of the respective pins 86, 87 beneath the fixed frame 76. Furthermore, washers 96, 97 are fitted on the upper end of the vertically movable pins 86, 87 respectively to prevent said pins from falling down. Also, both pressure plates 78, 79 are bent upward at the front ends 78a, 79a to be sleigh-shaped and the front end edge 40a' of said subplate 40a is formed parallel to the conveyer plate 30.

According to the pressing mechanism 41a thus constituted, immediately before the smoked ham urged by the conveyer plate 30 to be conveyed aslant while rotating spirally as mentioned above reaches the start end position of the ear cutting unit 32 and its ear 45a is sandwiched by both sandwiching conveyers 33a, 33b, the smoked ham 44 abuts against the front end edge 40a' of the subplate 40a and ride over the upper portion of same. Then, the smoked ham 44 abuts against the lower end of the front presure plate 77 and proceeds to pivot said plate 77 counterclockwise against the spring 84 as shown by the phantom line in FIG. 14. Thus, the smoked ham 44 then receives pressing reaction of the front pressure plate 77 to be pressed parallel to and against the front surface of the conveyer plate 30. Further, then, since the front end edge 40a' of the subplate 40a is also parallel to the conveyer plate 30, the position of the smoked ham 44 is corrected to be parallel to the conveyer plate 30 by the fact that the smoked ham 44 abuts against said front end edge 40'.

Thus, after the position of the smoked ham 44 is corrected to be parallel to the conveyer plate 30 (the position at right angle to both sandwiching conveyer), the ear 45a is sandwiched by both sandwiching conveyers 33a, 33b.

Figure 14:
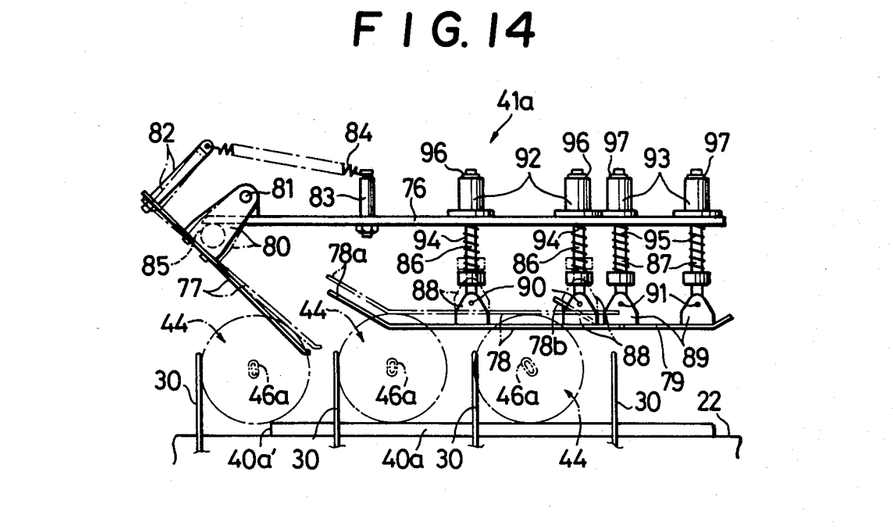
FIG. 14 is a side view showing the pressure plate portion.

And while thereafter the smoked ham 44 is conveyed to the position in which the ear 45a is sandwiched by both sandwiching conveyers to be cut off by the cutter 37a, the smoked ham 44 pushes up the intermediate and rear pressure plates 78, 79 against these plural springs 94, 95 as shown by the phatom line in FIG. 14 and proceeds to maintain the condition pressed parallel to the front surface of the conveyer plate 30 by the pressing reaction of the pressure plates 78, 79. Then, the respective pressure plates 78, 79 ride over successively the upper portion of the passing smoked hams 44 with corrugated movement according to the resultant operation of vertical operation of the respective vertically movable pins 86, 87 and pivotal movement about the respective fulcrum pins 90, 91. However, these pressure plates 78, 79 may be consituted to be of vertically pivotal system similarly to the front pressure plate 77.

According to the above pressing mechanism, while the ear 45a of the smoked ham 44 is sandwiched by both sandwiching conveyers 33a, 33b to be conveyed to the cutting position of the cutter 37a, the smoked ham 44 can be positively maintained parallel to the conveyer plate 30. Namely, it is prevented positively that the other ear 45b side of the smoked ham 44 is moved forward or backward about the one sandwiched ear 45a by vibration or the like during said conveyance so that the smoked ham 44 is unexpectedly slanted with repect to the conveyer plate 30 and the one ear 45a left slanted is cut off aslant with cutter. Thus, the ear 45a can be always accurately cut off at right angle by the cutter 37a to minimize the size of cut end of the ear 45a. Further since the other pressing mechanism 41b is identical with said pressing mechanism 41a in construction, the description of the former is omitted.

Figure 15:
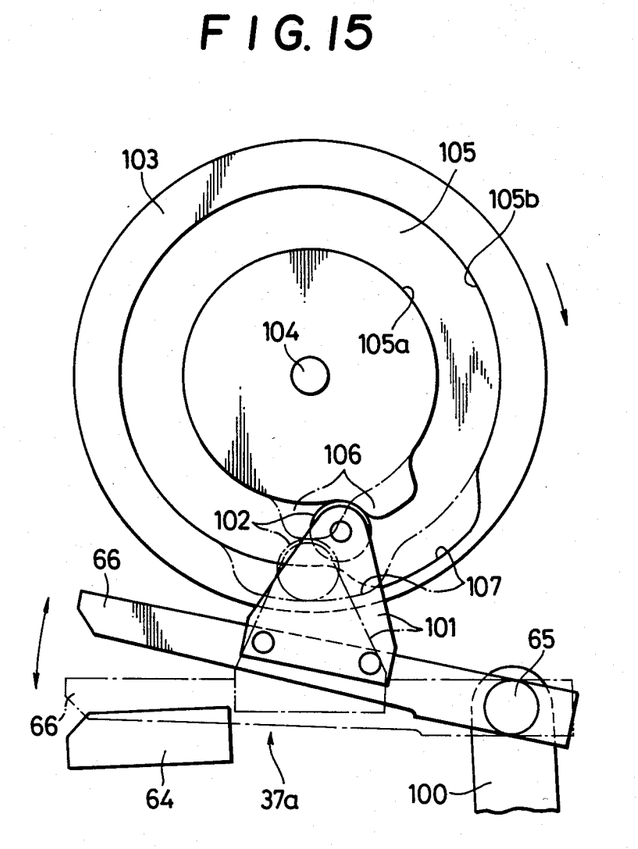
FIG. 15 is a side view showing a rotary cam portion for driving the cutter.

Next, will be described one cutter 37a with reference to FIG. 15. Further since the other cutter 37a is identical with the cutter 37a in construction, the description of the former is omitted.

Said fixed blade 64 is secured fixedly to the lower guide 35b and said movable blade 66 is pivoted vertically about the fulcrum shaft 65 on the fixed bracket 100. A roller 102 is rotatably provided at the upper end of a roller mounting plate 101 fixed to the movable blade 66. On the other hand, a rotary cam 103 driving vertically pivotally the movable blade 66 is secured fixedly to a rotary drive shaft 104 to be rotated integrally therewith, and provided with an endless cam groove 105 in which said roller 102 fits loosely. The cam groove 105 is provided on a portion of the inner peripheral surface 105a with a projection 106 which is opposed to a corresponding recess 107 provided in the outer peripheral surface 105b.

According to the cutter 37a thus constituted, the roller 102 is guided along the cam groove 105 by the clockwise rotational operation of the rotary cam 103 so that the projection 106 on the inner peripheral surface 105a urges the roller 102 to pivot counterclockwise the movable blade 66 as shown by the phantom line, and the ear 45a of said smoked ham 44 is cut off between the movable and fixed blades 66, 64. After the cutting-off, the roller 102 is lifted by the outer peripheral surface 105b of the cam groove 105 to pivot clockwise the movable blade 66 as shown by the solid line and carry out the cutting operation once a revolution of the rotary cam 103.

And according to this cutter 37a, the movable blade 66 can be forcibly lifted back (lifted up) by the rotary cam 103 immediately after the ear 45a of the smoked ham 44 is cut off. Thus, even if the cutter 37a cuts off the central portion or the like of the ligating fitting 46a on the smoked ham 44 by any causes and broken pieces thereof are unexpectedly sandwiched between the movable and fixed blades 66, 64, the movable blade 66 always not only returns to the upper position but also withdraw and remove positively the sandwiched broken pieces from between the movable and fixed blades 66, 64 when the movable blade 66 is forcibly lifted up. Thus, the unfavourable trouble that the cutter 37a is disabled by the inclusion of broken pieces of said ligating fitting 46a can be positively prevented and the ears 45a of the smoked hams 44 can be positively successively cut off to remove positively the ligating fittings 46.

Further in the above described embodiment, both ear cutting units 32a, 32b and both pressing mechanisms 41a, 41b are respectively mounted on a lifting mount not shown so that they can be adjusted vertically with respect to the height corresponding to the thickness (diameter) of the smoked ham 44 from the whole deck plate 22.

While the embodiment of this invention has been described hereinbefore, the endless rotatable body and sandwiching conveyer according to this invention are not limitted to those using the endless chains shown in the embodiment. For example, one using an endless belt also may employed and the pressing mechanism according to this invention is not limitted to the one shown in the embodiment. For example one using rollers may be employed. In addition, said embodiment may be variously modified on the basis of technical concepts of this invention.

What is claimed is:

1. An apparatus for removing ligating fittings of smoked ham casings comprising:
   a plurality of conveyer plates mounted on a pair of endless rotary bodies and moved along a fixed deck plate for conveying smoked hams in parallel with each other along an upper surface of the deck plate;
   a deflecting conveyer arranged on the deck plate aslant of the moving direction of the conveyer plates and moved with higher speed than that of the conveyer plates for conveying each smoked ham outwardly toward a side of the deck plate;
   a sandwiching conveyer arranged by the side of the deck plate and moved in the same direction and with the same speed as the conveyer plates for sandwiching an ear of the smoked ham casing brought near the side of the deck plate;
   a guide means arranged by the side of the deck plate and inwardly of the sandwiching conveyer, the ear of the smoked ham casing being inserted into a lateral slot thereof for leading the ligating fitting near the base of the ear in an outward direction; and
   a cutter arranged in a terminal end of the guide for cutting the base of the ear off inwardly of the ligating fitting, said guide means having a first guide portion upstream and a second guide portion downstream in the moving direction of said conveyer plates, said first guide portion including a slant surface which traverses inwardly and gradually away from said sandwiching conveyer in the downstream direction, and said second guide portion including a slant surface which traverses outwardly and gradually toward said sandwiching conveyer in the downstream direction, said second guide portion being positioned between said shoulder and said ligating fitting, while said ear is conveyed by said sandwiching conveyer, whereby said first guide portion urges said shoulder inwardly while the outer end of said ear is conveyed downstream by said sandwiching conveyer and said second guide portion urges said ligating fitting outwardly from said shoulder due to a relative extension between the outer end and the shoulder of said ear, thereby enlarging the gap between said ligating fitting and said shoulder, the base of said ear being cut off by said cutter within said enlarged gap.

2. An apparatus for removing ligating fittings of smoked ham casings as defined by claim 1 further comprising:
   means for pressing said smoked hams against said conveyer plates, said pressing means including three independently movable pressure plates.

3. An apparatus for removing ligating fittings of smoked ham casings as defined by claim 1, wherein said cutter comprises:
   a fixed blade;
   a movable blade which cooperates with said fixed blade, said movable blade being reciprocally mounted with respect to said fixed blade and cooperating therewith.

4. An apparatus for removing ligating fittings of smoked ham casings as defined by claim 1, wherein said cutter comprises:
   a fixed blade, a movable blade which cooperates with said fixed blade;
   a roller rotatably mounted on said movable blade; and
   a rotary cam in an endless cam groove, said movable blade being driven by said rotary cam.

* * * * *